United States Patent [19]

Uemura

[11] Patent Number: 5,058,029
[45] Date of Patent: Oct. 15, 1991

[54] SETTING CONTROL METHOD OF MACHINING COORDINATE SYSTEM IN A MACHINE TOOL

[75] Inventor: Kazuki Uemura, Keseel-Lo, Belgium

[73] Assignee: Yamazaki Mazak Kabushiki Kaisha, Ooguchi, Japan

[21] Appl. No.: 329,633

[22] Filed: Mar. 28, 1989

[30] Foreign Application Priority Data

Mar. 28, 1988 [JP] Japan .................................. 63-73646

[51] Int. Cl.⁵ .......................... G05B 19/18; B23B 3/30
[52] U.S. Cl. ................................ 364/474.18; 82/120; 82/129; 364/474.02; 364/474.11
[58] Field of Search ........................ 364/474.02, 474.11, 364/474.18, 474.34, 474.35; 318/572, 567, 632; 82/129, 117, 118, 120, 159

[56] References Cited

U.S. PATENT DOCUMENTS

| | | | |
|---|---|---|---|
| 4,612,832 | 9/1986 | Ushigoe et al. | 82/129 |
| 4,680,719 | 7/1987 | Kishi et al. | 364/474.02 |
| 4,683,786 | 8/1987 | Kersten et al. | 364/474.02 |
| 4,719,579 | 1/1988 | Niwa | 364/474.18 |

Primary Examiner—Joseph Ruggiero
Attorney, Agent, or Firm—Wenderoth, Lind & Ponack

[57] ABSTRACT

A machine tool having the first and second spindle stocks being relatively movable in Z axis direction in the shape of facing to each other and workpiece spindles provided rotatably through which a workpiece can be held by those spindle stocks.

Machining in the first spindle stock is performed on a basis of the machining coordinate system set relating to the first spindle stock according to the first offset value and machining in the second spindle stock is performed on a basis of the machining coordinate system relating to the second spindle stock set by computing on a basis of said first offset value or the second offset value.

7 Claims, 15 Drawing Sheets

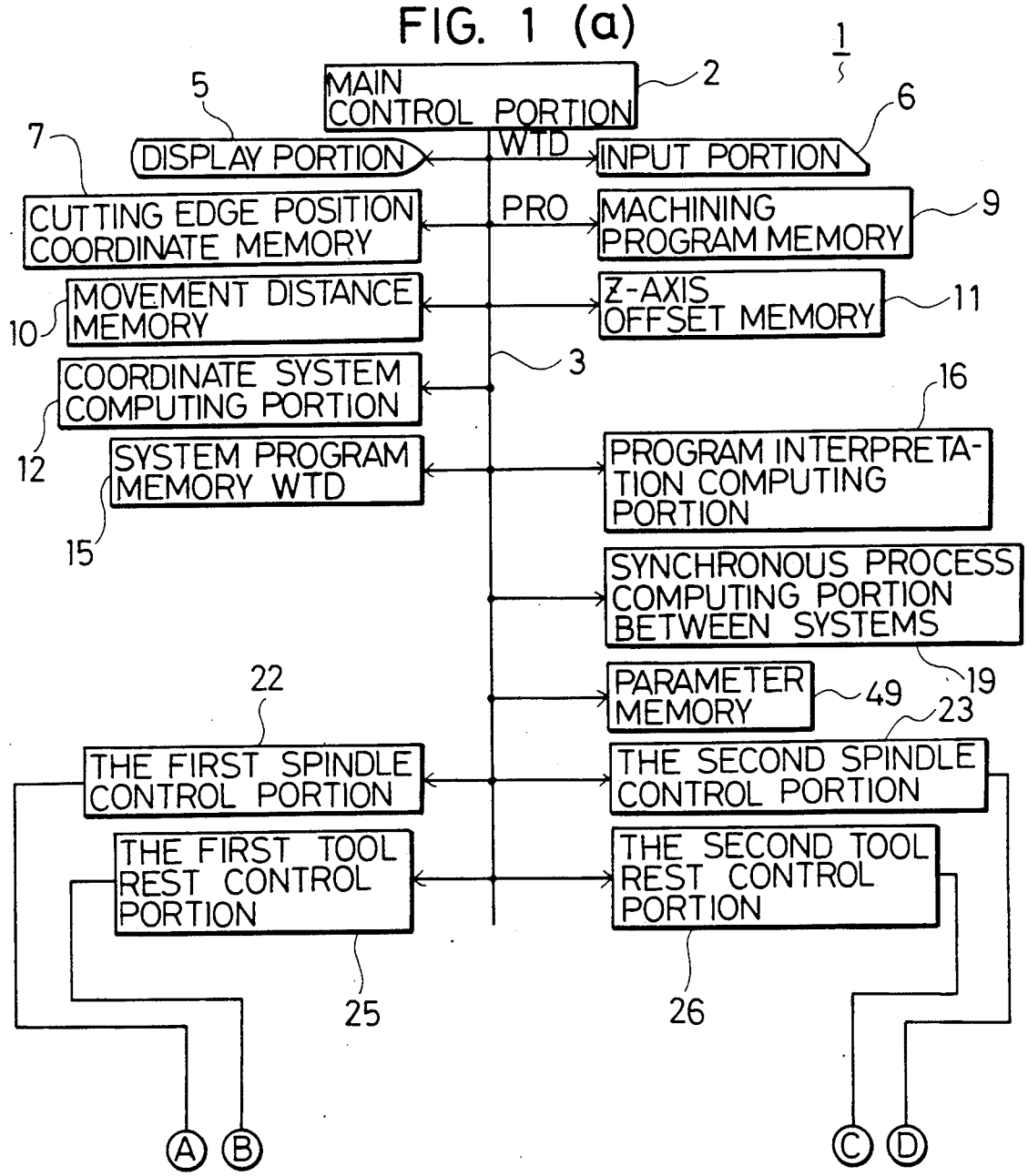

SETTING CONTROL METHOD OF MACHINING COORDINATE SYSTEM IN A MACHINE TOOL

BACKGROUND OF THE INVENTION

The present invention relates to a method of controlling the setting of a machining coordinate system in a machine tool suitable for application when machining is being performed on a workpiece on both spindle stocks in a machine tool having two spindle stocks on which workpiece spindles are mounted facing each other.

A machine tool capable of executing a first routine of machining and a second routine of machining for each workpiece spindle successively in such a manner that spindle stocks having workpiece spindles provided facing each other are relatively free to move and drive in the Z axis direction and a workpiece is delivered between workpiece spindles, performing machining on a long sized workpiece without a center rest in such a manner that the long sized workpiece is rotated while being held between both workpiece spindles and performing machining successively on a bar shaped workpiece, a predetermined length of which is pulled out from one workpiece spindle at a time, has recently been proposed.

However, the manner of setting a machining coordinate system when machining a workpiece between workpiece spindles in a case where two spindle stocks are provided facing each other is important for proper machining, and development of such a control method is desired.

In consideration of the above, the object of this invention is to provide a method of controlling the setting of a machining coordinate system in a machine tool capable of performing machining in a workpiece in opposed spindle stocks smoothly.

SUMMARY OF THE INVENTION

To achieve this object, the present invention provides a method for setting a machining coordinate system in a machine tool having first and second spaced opposed spindle stocks which are relatively movable toward and away from each other in a first direction and having rotatable workpiece spindles by which a workpiece can be held on the respective spindle stocks, comprising: composing a machining program on the basis of a workpiece origin established for a workpiece; setting a standard origin which moves together with one spindle stock in said first direction at least between the two spindle stocks; setting a distance between said standard origin and said workpiece origin as a first offset value; setting a first machining coordinate system for said first spindle stock on the basis of said first offset value and using said first machining coordinate system for performing machining of the workpiece in the first spindle stock according to said machining program; and setting a second machining coordinate system for the second spindle stock on the basis of said first offset value and an amount of movement of said second spindle stock toward a mechanical origin, and using said second machining coordinate system for performing machining on the workpiece in the second spindle stock according to said machining program.

Alternatively, the invention provides a method for setting a machining coordinate system in a machine tool having first and second spaced opposed spindle stocks which are relatively movable toward and away from each other in a first direction and having rotatable workpiece spindles by which a workpiece can be held on the respective spindle stocks, comprising: composing a machining program on the basis of a workpiece origin established for a workpiece; setting a first standard origin which moves together with the first spindle stock in said first direction; setting a second standard origin which moves together with the second spindle stock in said first direction; setting the distance between a workpiece origin of a workpiece mounted in said first spindle stock and said first standard origin as a first offset value; setting the distance between said workpiece origin of said workpiece mounted in said second spindle stock and said second standard origin as a second offset value; setting a first machining coordinate system for said first spindle stock on the basis of said first offset value and using said first machining coordinate system for performing machining on said workpiece mounted in said first spindle stock according to said machining program; and setting a second machining coordinate system for said second spindle stock on the basis of said second offset value and using said second machining coordinate system for performing machining on said workpiece mounted in said second spindle stock according to said machining program.

As a further alternative, the invention provides a method for setting a machining coordinate system in a machine tool having first and second spaced opposed spindle stocks which are relatively movable toward and away from each other in a first direction and having rotatable workpiece spindles by which a workpiece can be held on the respective spindle stocks, comprising: composing a machining program on the basis of a workpiece origin established for a workpiece; setting a standard origin which moves together with one spindle stock in said first direction at least between the two spindle stocks; setting a distance between said standard origin and said workpiece origin as a first offset value; setting a first machining coordinate system for said first spindle stock on the basis of said first offset value and using said first machining coordinate system for performing machining of the workpiece in the first spindle stock according to said machining program; moving said first and second spindle stocks a first and second distance, respectively, toward each other for bringing said spindle stocks close together when the machining of the workpiece in the first spindle stock is completed, and transferring the workpiece from said first spindle stock to said second spindle stock; obtaining a second offset value based on said first offset value and said first and second distances; setting a second machining coordinate system for said second spindle stock on the basis of said second offset value, and using said second machining coordinate system for performing machining on the workpiece in said second spindle stock according to said machining program.

As another alternative, the invention provides a method for setting a machining coordinate system in a machine tool having first and second spaced opposed spindle stocks which are relatively movable toward and away from each other in a first direction and having rotatable workpiece spindles by which a workpiece can be held on the respective spindle stocks, comprising: composing a machining program on the basis of a workpiece origin established for a workpiece; setting a first standard origin which moves together with the first spindle stock in said first direction; setting a second standard origin which moves together with the second spindle stock in said first direction; setting the distance between a workpiece origin of a workpiece mounted in said first spindle stock and said first standard origin as a first offset value; setting the distance between said workpiece origin of said workpiece mounted in said second spindle stock and said second standard origin as a second offset value; setting a first machining coordinate system for said first spindle stock on the basis of said first offset value and using said first machining coordinate system for performing machining on said workpiece mounted in said first spindle stock according to said machining program; moving said first and second spindle stocks a first and second distance, respectively, toward each other for bringing said spindle stocks close together when the machining of the workpiece in the first spindle stock is completed, and transferring the workpiece from said first spindle stock to said second spindle stock; setting a second machining coordinate system for said second spindle stock on the basis of said second offset value, and using said second machining coordinate system for performing machining on the workpiece in said second spindle stock according to said machining program.

As still another alternative, the invention provides a method for setting a machining coordinate system in a machine tool having first and second spaced opposed spindle stocks which are relatively movable toward and away from each other in a first direction and having rotatable workpiece spindles by which a workpiece can be held on the respective spindle stocks, comprising: composing a machining program on the basis of a workpiece origin established for a workpiece; setting a standard origin which moves together with one spindle stock in said first direction at least between the two spindle stocks; setting a distance between said standard origin and said workpiece origin as a first offset value; moving said first and second spindle stocks toward each other first and second distances for engaging and holding a workpiece to be machined therebetween; setting a first machine coordinate system for said first spindle stock on the basis of said first offset value and the first distance, and setting a second machining coordinate system for said second spindle stock on the basis of said first offset value and said second distance, and using said first and second machining coordinate systems for performing machining of the workpiece according to the machining program.

As yet another alternative, the invention provides a method for setting a machining coordinate system in a machine tool having first and second spaced opposed spindle stocks which are relatively movable toward and away from each other in a first direction and having rotatable workpiece spindles by which a workpiece can be held on the respective spindle stocks, comprising: composing a machining program on the basis of a workpiece origin established for a workpiece; setting a first standard origin which moves together with the first spindle stock in said first direction; setting a second standard origin which moves together with the second spindle stock in said first direction; setting the distance between a workpiece origin of a workpiece mounted in said first spindle stock and said first standard origin as a first offset value; setting the distance between said workpiece origin of said workpiece mounted in said second spindle stock and said second standard origin as a second offset value; moving said first and second spindle stocks toward each other first and second distances for engaging and holding a workpiece to be machined therebetween; setting a first machine coordinate system for said first spindle stock on the basis of said first offset value and the first distance, and setting a second machining coordinate system for said second spindle stock on the basis of said first offset value and said second distance, and using said first and second machining coordinate systems for performing machining of the workpiece according to the machining program.

As another alternative, the invention provides a method for setting a machining coordinate system in a machine tool having first and second spaced opposed spindle stocks which are relatively movable toward and away from each other in a first direction and having rotatable workpiece spindles by which a workpiece can be held on the respective spindle stocks, comprising: composing a machining program on the basis of a workpiece origin established for a workpiece; setting a standard origin which moves together with one spindle stock in said first direction at least between the two spindle stocks; setting a distance between said standard origin and said workpiece origin as a first offset value; causing a workpiece to extend through said first spindle stock and project toward said second spindle stock by an amount corresponding to the first offset value; setting a first machining coordinate system for said first spindle stock on the basis of said first offset value and using said first machining coordinate system for performing a first machining of the workpiece held in the first spindle stock according to said machining program; after completion of the first machining, moving said first and second spindle stocks toward each other through first and second distances, respectively, and gripping the end of the workpiece projecting from said first spindle stock by said second spindle stock; releasing the workpiece from said first spindle stock and moving said first and second spindle stocks away from each other through third and fourth distances, respectively, for pulling a length of said workpiece corresponding to the third and fourth distances through said first spindle stock; setting the distance of the position of the workpiece origin of the thus pulled through workpiece from said standard origin as a third offset value; and setting a second machining coordinate system for the first spindle stock on the basis of said third offset value and using said second machining coordinate system for performing a second machining of the workpiece pulled through said first spindle stock according to said machining program.

With the above-described method, proper machining movements can be executed in a case where machining is performed on a long and slender bar shaped workpiece which is pulled out from the first spindle stock.

DESCRIPTION OF THE PREFERRED EMBODIMENTS

Figure 1:
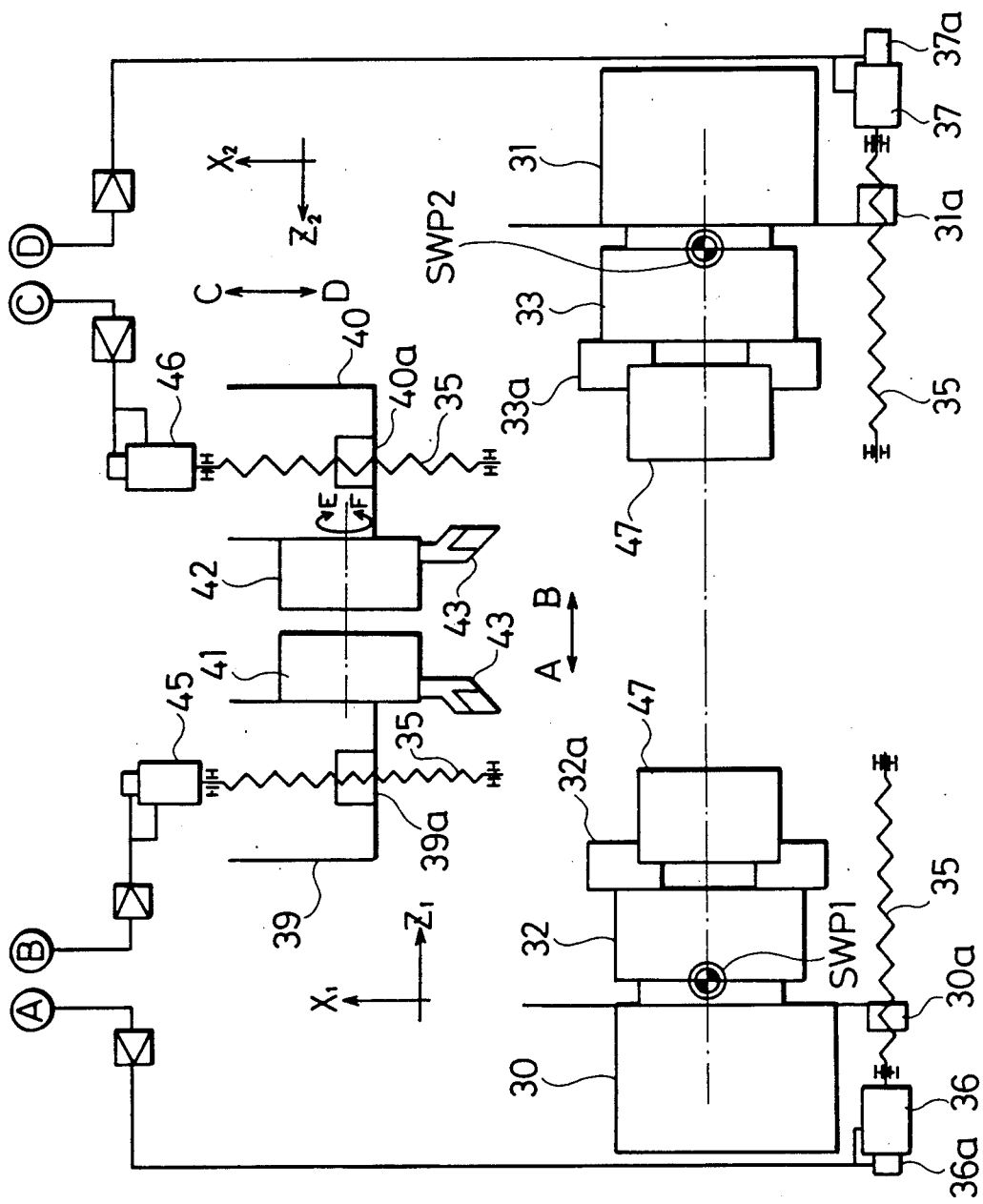
FIGS. 1a and 1b are a block diagram and a schematic diagram, respectively, showing an example of a complex machining machine tool to which an embodiment of a method of controlling the setting of a machining coordinate system according to the present invention is applied.

A complex machining machine tool 1 has a main control portion 2 as shown in FIG. 1a. A display portion 5 such as a display, an input portion 6 such as a keyboard, a cutting edge position coordinate memory 7, a machining program memory 9, a movement distance memory 10, a Z-axis offset memory 11, a coordinate system computing portion 12, a system program memory 15, a program interpretation computing portion 16, a synchronous process computing portion between systems 19, a parameter memory 49, a first spindle control portion 22, a second spindle control portion 23, a first tool rest control portion 25, a second tool rest control portion 26 and the like are connected with the main control portion 2 through a bus line 3.

Two spindle stocks 30 and 31 are provided in the complex machining machine tool 1 and are free to move and drive in a Z-axis direction, that is, in the directions as shown by the arrows A and B in FIG. 1b. Workpiece spindles 32, 33 are rotatably and drivably provided with the spindle stocks 30, 31, respectively. Chucks 32a, 33a are provided in the workpiece spindles 32, 33. Moreover, ball screws 35 are fitted in the spindle stocks 30, 31 through nuts 30a and 31a. Spindle stock driving motors 36, 37 are provided on the spindle stock driving motors 36, 37. The first spindle control portion 22 and the second spindle control portion 23 are connected with the spindle stock driving motors 36, 37 and the transducers 36a, 37a, respectively.

Tool rests 39 and 40 are movably and drivably provided for movement in the directions as shown by the arrows C and D perpendicular to the directions as shown by the arrows A and B, that is, in the X-axis direction corresponding to the spindle stocks 30, 31 above the spindle stocks 30, 31 in FIG. 1b. Turrets 41, 42 are rotatably and indexably mounted on the tool rests 39, 40 disposed back to back and rotatable in the directions as shown by the arrows E and F. A plurality of tools 43 are indexably provided on the turrets 41, 42 at predetermined machining positions. Further ball screws 35, 35 to which tool rest driving motors 45, 46 are connected are fitted in the tool rests 39, 40 through nuts 39a, 40a. The tool rests 39, 40 are moved and driven in the directions as shown by the arrows C and D by driving the tool rest driving motors 45, 46 forward and reversely.

With the above-described construction of the complex machining machine tool 1, where machining is performed on a workpiece 47 by using the complex machining machine tool 1, the workpiece 47 is mounted on the workpiece spindle 32 of the spindle stock 30 in the chuck 32a. In this state, the first routine of machining is performed on a basis of a machining program PRO relating to the workpiece 47 which is stored in the machining program memory 9. This machining is performed by means of a tool 43 indexed to a predetermined machining position on the turret 41 of the tool rest 39 in such a manner that the first spindle control portion 22 causes the spindle stock driving motor 36 to move the spindle stock 30 through the ball screw 35 the proper amounts in the directions as shown by the arrows A and B, that is, in the $Z_1$-axis direction (the coordinate system on which the spindle stock 30 and the tool rest 39 are moved and driven is referred to as the $Z_1$-$X_1$ coordinate system) and the first tool rest control portion 25 causes the tool rest driving motor 45 to move the tool rest 39 through the ball screw 35 the proper amounts in the directions as shown by the arrows C and D, that is, in the $X_1$-axis direction.

In this way, after the predetermined first routine of machining is performed on the workpiece 47 held by the workpiece spindle 32, the tool rest 39 is retracted in the direction as shown by the arrow C. Thereafter, the spindle stocks 30, 31 are moved in the directions as shown by the arrows A and B by driving the spindle stock driving motors 36, 37 through the first spindle control portion 22 and the second spindle control portion 23 to move the spindle stocks toward each other. Then, the right end portion of the workpiece 47 is FIG. 1b held by the workpiece spindle 32 in the chuck 32a is fitted and engaged with the chuck 33a of the approaching workpiece spindle 33 which is in an open state and the workpiece 47 is then held by both chucks 32a and 33a. Then the chuck 32a on the workpiece spindle 32 is opened leaving the workpiece 47 held only by the chuck 33a of the workpiece spindle 33. Thereafter, the workpiece 47 is moved away from the spindle stock 30 by moving and driving the spindle stock 31 in the direction as shown by the arrow B. In this way, after the workpiece 47 on which the first routine has been completed is delivered to the workpiece spindle 33, a second routine of machining on a basis of the machining program PRO is executed on the workpiece 47.

This machining is performed by means of a tool 43 indexed to a predetermined machining position on the turret 42 of the tool rest 40 in such a manner that the second spindle control portion 23 causes the spindle stock driving motor 37 to move the spindle stock 31 through the ball screw 35 the proper amounts in the directions as shown by the arrows A and B, that is, in the $Z_2$-axis direction (the coordinate system on which the spindle stock 31 and the tool rest 40 are moved and driven is referred to as the $Z_2$-$X_2$-axis coordinate system) and the second tool rest control portion 26 causes the tool rest driving motor 46 to move the tool rest 40 through the ball screw 35 the proper amounts in the directions as shown by the arrows C and D, that is, in the $X_2$-axis direction. During this time, the workpiece spindle 32 of the spindle stock 30 is supplied with a new raw workpiece 47 and the first routine of machining is performed on the new raw workpiece 47 on the basis of the machining program PRO.

In this way, after the second routine of machining on the workpiece 47 installed in the spindle stock 31 is finished, the workpiece 47 on which the second routine of machining has been carried out is received from the spindle stock 31. Then, the workpiece 47 on the spindle stock 30 side on which the first routine has been completed is delivered to the spindle stock 31 and the second routine of machining is performed on the delivered workpiece 47 on which the first routine has already been performed in a similar manner to the above-described case. In this way, the first routine and the second routine of machining are performed on the basis of the machining program PRO while the workpieces 47 are delivered between the workpiece spindles 32 and 33 one after another. Machining movements including the delivery of the workpiece 47 between the workpiece spindles 32 and 33 are controlled on a basis of the machining delivery execution program WTP stored in the system program memory 15.

Figure 4:
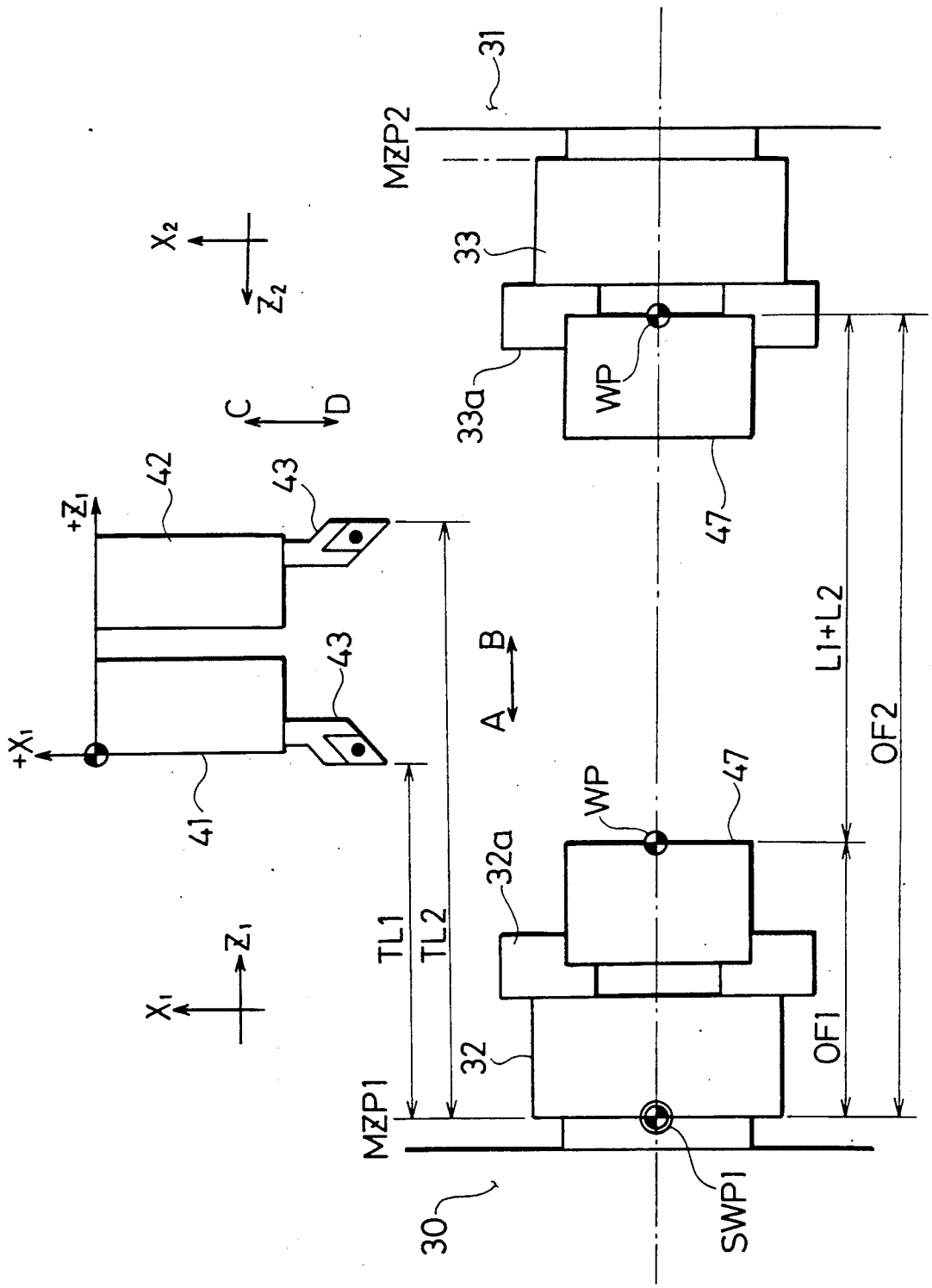
FIGS. 4 and 5 are diagrammatic views showing an example of a method of machining a chuck-type workpiece.

An operator inputs data necessary for delivery through the input portion 6 as the delivery data WTD prior to the machining of the chuck-type workpiece 47. As shown in FIG. 4, the first Z-offset value OF1 in the Z axis direction between the standard workpiece origin SWP1 in the spindle stock 30 and the workpiece origin WP on which the machining program PRO for the workpiece 47 installed in the workpiece spindle 32 of the spindle stock 30 is based when the spindle stock 30 is positioned at the mechanical origin MZP1 on the $Z_1$-axis, the first movement distance L1 the spindle stock 30 is to be moved from the mechanical origin MZP1 on the $Z_2$-axis in the positive direction, that is, in the direction as shown by the arrow A in FIG. 5 when the workpiece is delivered, are adopted and inputted as the delivery data WTD. The distance between the tools 43 installed in the turrets 41 and 42 and the standard workpiece origin SWP1, that is, the mechanical origin MZP1 (in case of measurement in a state in which the workpiece origin SWP1 corresponds to the mechanical origin MZP1) is stored as the first tool set value TL1 and the second tool set value TL2, respectively, in the cutting edge position coordinate memory 7.

When the delivery data WTD is inputted from the input portion 6, the first Z-offset value OF1 in the inputted delivery data WTD is stored in the Z-axis offset memory 11 and the first movement distance L1 and the second movement distance L2 in the inputted delivery data WTD are stored in the movement distance memory 10. When the delivery data WTD is stored in the respective memories, the main control portion 2 carries out the delivery execution program WTP to perform machining of the workpiece 47 on the basis of the above-described machining program PRO and controls delivery of the workpiece 47 between the workpiece spindles 32 and 33.

Figure 2:
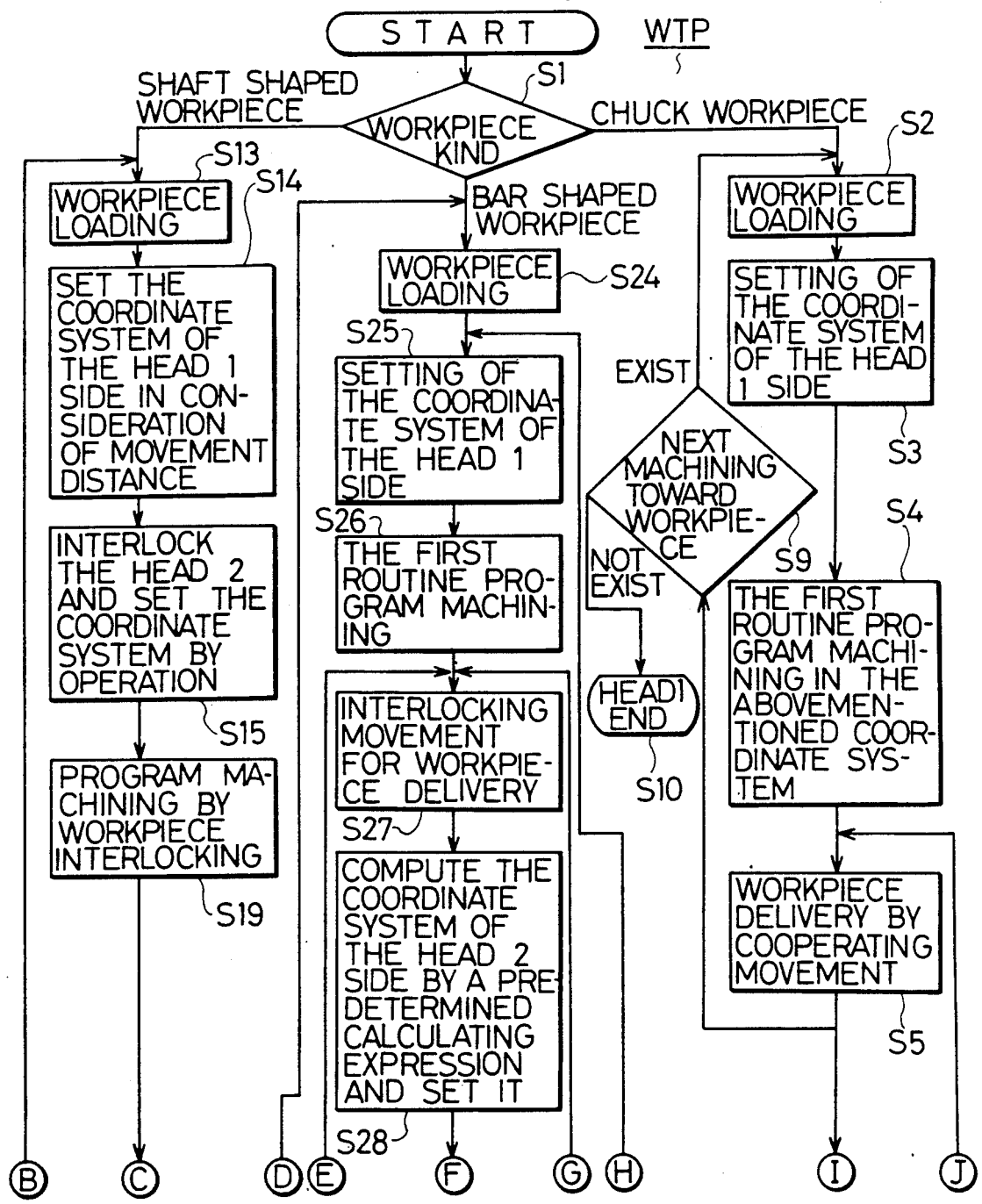
FIGS. 2a–2c and 3 are flowcharts showing an example of a machining execution program.
Figure 2:
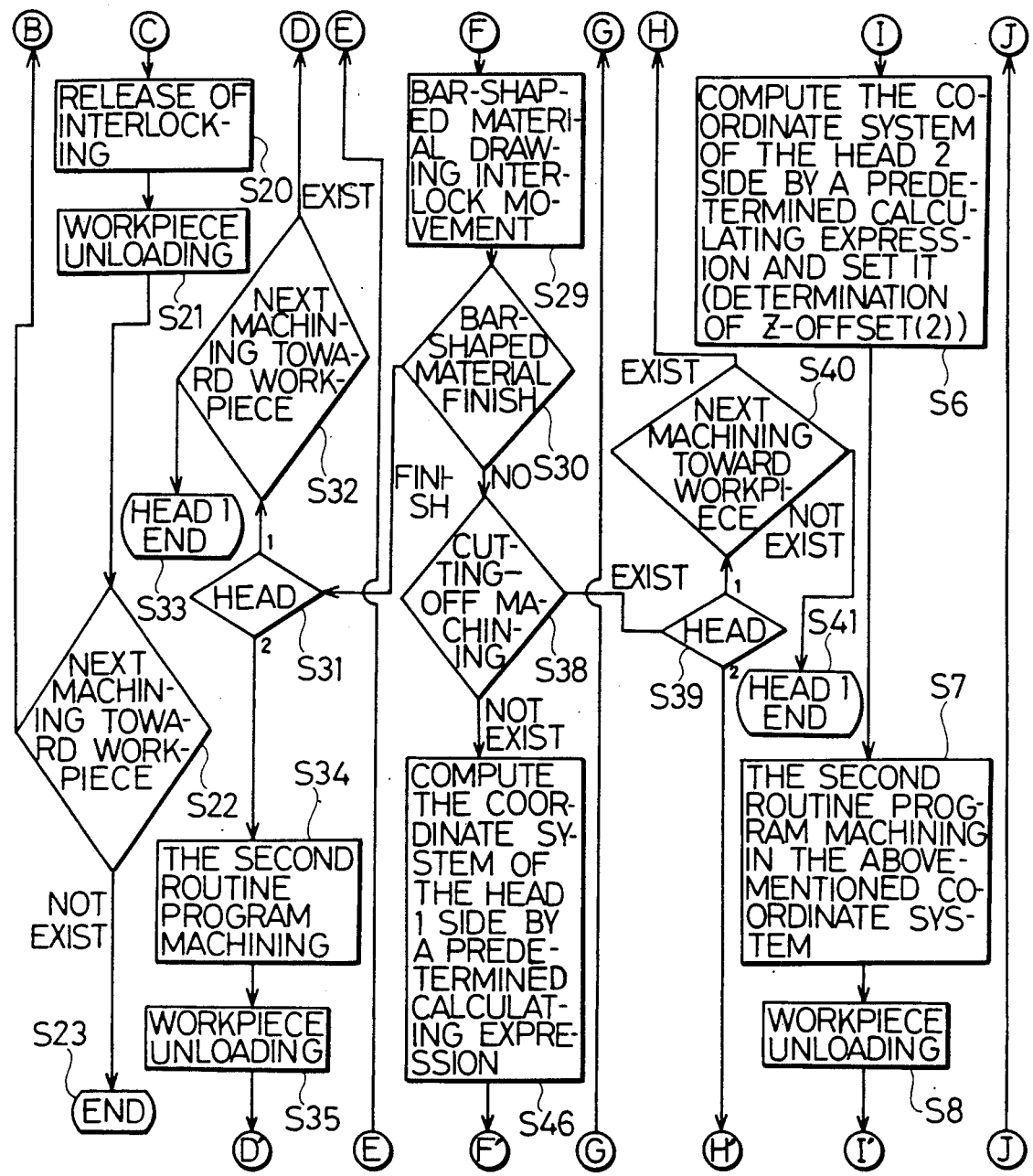
Figure 2:
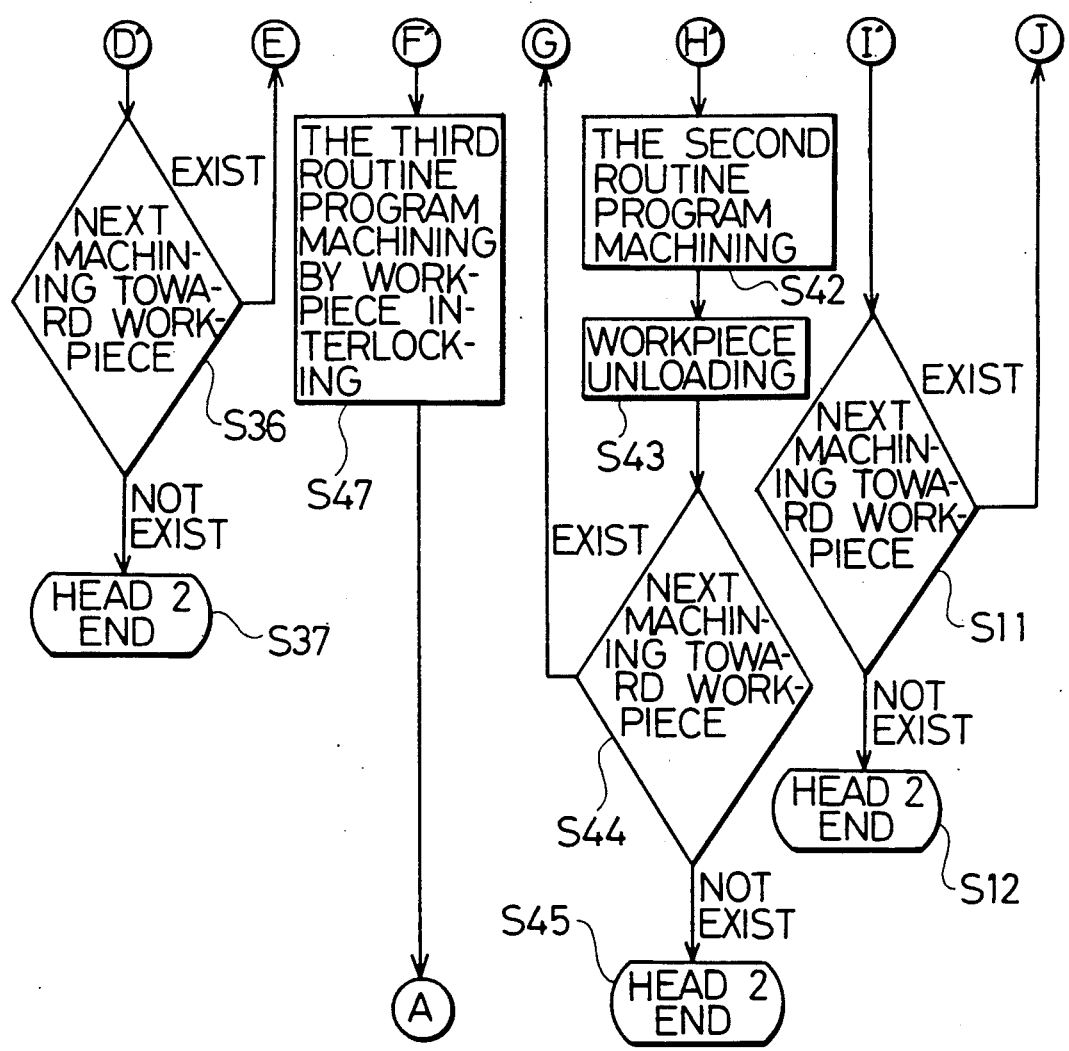

That is to say, at the step S1 as shown in FIG. 2a, the delivery executed program WTP judges whether the workpiece 47 to be machined is a chuck or chuck-type workpiece in which the length of the Z axis direction is relatively short in comparison with its diameter, a shaft shaped workpiece in which the length in the Z axis direction is relatively long in comparison with its diameter, or a bar shaped workpiece on which machining is performed while the bar-shaped slender workpiece is pulled out from the workpiece spindle 32 by a predetermined length each time. This judgment is performed on the basis of the form of the workpiece 47 provided in the program and the commands in the machining program PRO in such a manner that the program interpretation computing portion 16 interprets the machining program PRO to be executed from this step on. When it is judged that the workpiece 47 is a chuck workpiece in step S1, the program proceeds to the step S2, the loading of the workpiece 47 in the workpiece spindle 32 is carried out on the basis of the machining program PRO and the first Z-offset value OF1 of the delivery data WTD is read out from the Z-axis offset memory 11 at the step S3 to set the machining coordinate system for the spindle stock 30 (indicated as "Head 1" in FIGS. 2 and 3) in the $X_1$-$Z_1$ direction on the basis of the standard workpiece origin SWP1.

In this way, after the machining coordinate system is set for the spindle stock 30 on the basis of the standard workpiece origin SWP1, the program proceeds to the step S4. The first routine of machining is performed by the machining program PRO on the basis of the set machining coordinate system in such a manner that the tool rest 39, that is, the turret 41 is moved in the directions as shown by the arrows C and D while the spindle stock 30 is moved in the directions as shown by the arrows A and B in FIG. 4. At this time, the machining program PRO to be performed on the spindle stock 30 side is composed on the basis of the workpiece origin WP. Further, the distance between the work piece origin WP and the standard workpiece origin SWP1 is defined as the first Z-offset value OF1, the distance between the standard workpiece origin SWP1 and the mechanical origin MZP1 is always retrieved by the first spindle control portion 22 through the transducer 36 and the like and the distance between the tool 43 on the tool rest 39 and the mechanical origin MZP1 is defined as the first tool set value TL1. Thus, the machining on the workpieces in the spindle stock 30 on the basis of the machining program PRO can be easily executed by judging the coordinate positional relation.

Figure 5:
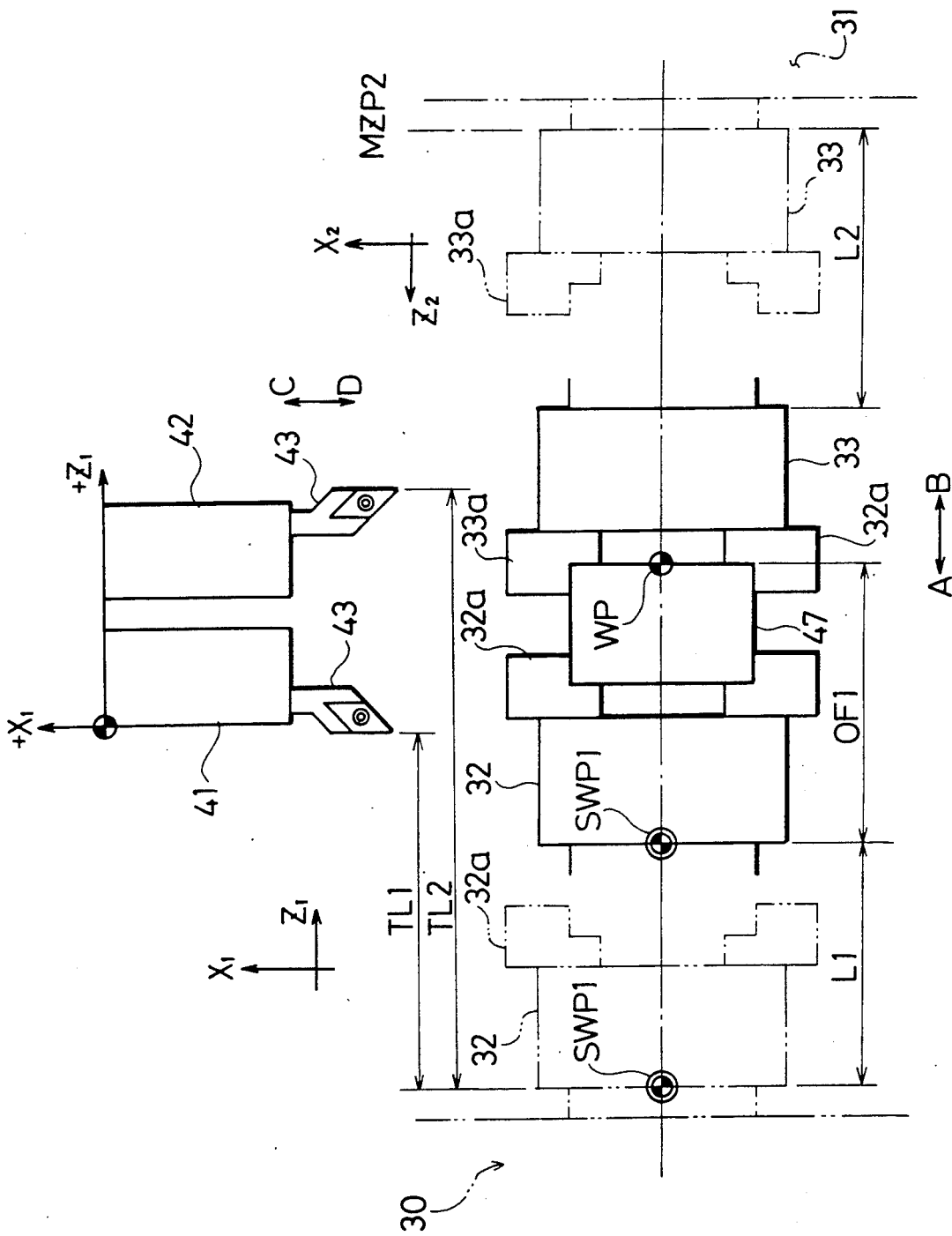

In this way, when the first routine of machining on the workpiece 47 is finished, the program proceeds to the step S5. The main control portion 2 performs delivery of the workpiece 47 after the first machining routine from the spindle stock 30 to the spindle stock 31. This delivery is performed in such a manner that the first spindle control portion 22 causes the spindle stock 30 to move in the direction as shown by the arrow B through the first movement distance L1 and the second spindle control portion 23 causes the spindle stock 31 to move in the direction as shown by the arrow A the second movement distance L2. When the spindle stocks 30 and 31 are moved the distances L1 and L2 respectively, the right end portion of the workpiece 47 in FIG. 4 held by the chuck 32a on workpiece spindle 32 of the spindle stock 30 is fitted in the chuck 33a on workpiece spindle 33 of the spindle stock 31 as shown in FIG. 5 and the right end portion is held by the chuck 33a of the workpiece spindle 33.

Then, while the workpiece 47 is held by the chuck 33a, the grip of chuck 32a, which is on the workpiece spindle 32, on the workpiece 47 is released. The spindle stock 30 is retracted in the direction as shown by the arrow A and the spindle stock 31 is moved in the direction as shown by the arrow B to finish the delivery movements.

Thereafter, the program proceeds to the step S6 for the main control portion 2 so that the machining on the workpiece 47 delivered to the spindle stock 31 can be performed on the side of the tool rest 40, that is, on the turret 42 side. The main control portion 2 obtains the second Z-offset value OF2 for setting the position of the workpiece origin SP of the tool on the tool rest 40 side on the basis of the standard position at which the second tool set value TL2 is set, that is to say, the mechanical origin MZP1. The second Z-offset value OF2 is obtained by the following expression (1).

$$OF2 = L1 + L2 + OF1 \tag{1}$$

Figure 3:
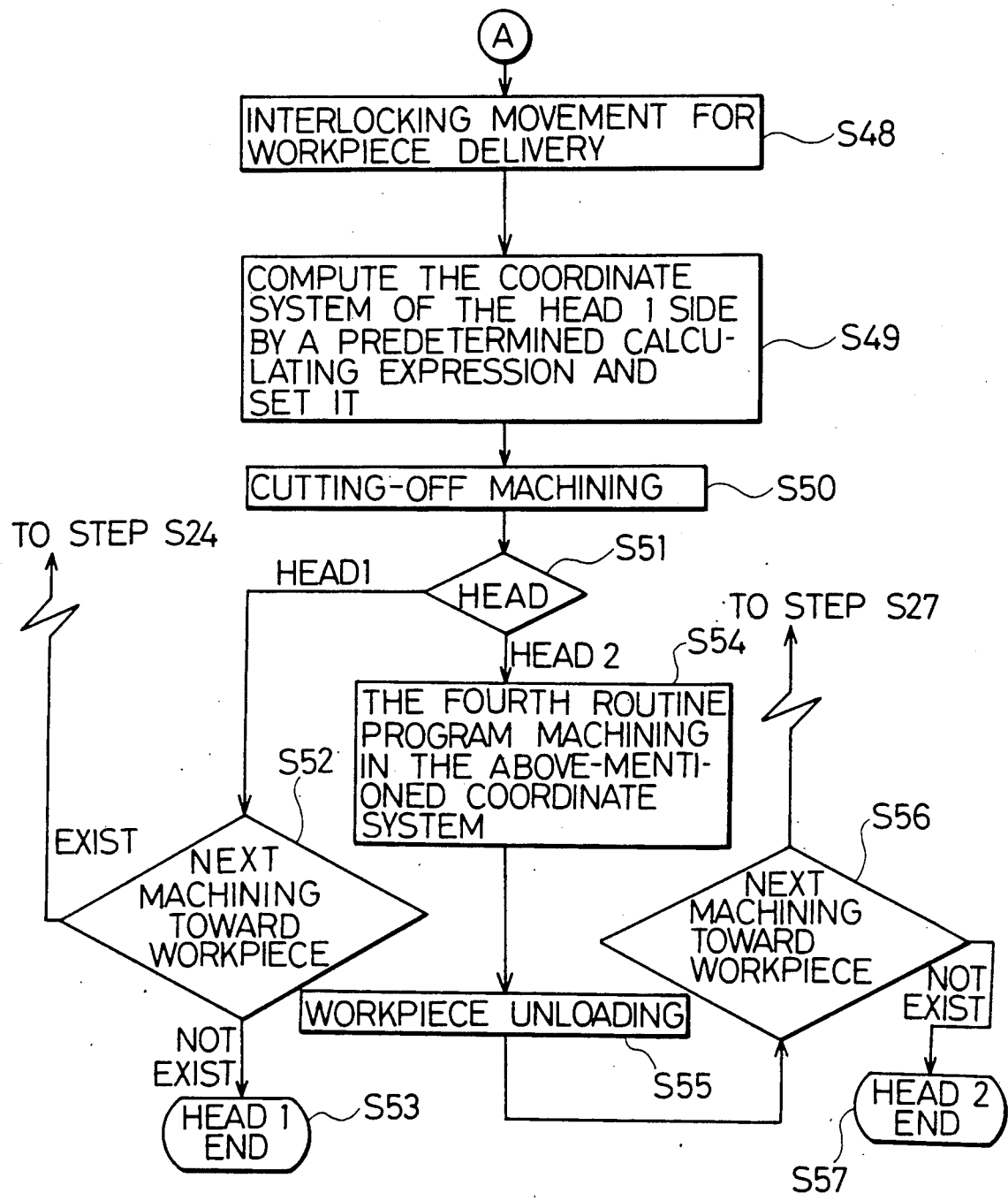

In this way, after the second Z-offset value OF2 is obtained, a new machining coordinate system is set in the $X_2$-$Z_2$ direction at the position which is a predetermined second offset value OF2 away from the mechanical origin MZP1 as shown in FIG. 4 in the right direction in the figure, that is, on the side of the spindle stock 31 (shown as "Head 2" in FIGS. 2 and 3). The second routine of machining on the basis of the machining program PRO is in the step S7 on the workpiece 47 on the workpiece spindle 33 on which the first routine has already been performed.

In this case, the distance of the origin position of the machining coordinate system newly set (the position of the workpiece origin WP when the spindle stock 31 is positioned at the mechanical origin MZP2 on the side of the spindle stock 31) from the mechanical origin MZP1 is defined as the second Z-offset value OF2. The positional relation between the tool 43 and the mechanical origin MZP1 is defined as the second tool set value TL2. Moreover, the positions of the tool 43 of the turret 42 and the spindle stock 31 toward the mechanical origin MZP2 (the mechanical origin MZP1 since the distance between the mechanical origin MZP1 and MZP2 is fixed) are always detected by the second spindle control portion 23, the second tool rest control portion 26, the transducer 37a and the like. Accordingly, the machining on the workpiece on the spindle stock 31 on the basis of the machining program PRO can be easily executed by computing on the basis of those relations.

In this way, when the second routine of machining on the workpiece 47 on the workpiece spindle 33 is finished, the program proceeds to step S8. Then, the workpiece 47 after completion of the second routine of machining is removed from the workpiece spindle 33.

On the other hand, after the workpiece 47 is transferred between the workpiece spindles 32 and 33 at step S5, the program proceeds to step S9 for the spindle stock 30 and it is judged whether or not there is a further workpiece 47 to be machined in the spindle stock 30. In the case where there is no further workpiece 47 to be machined, the program proceeds to step S10 and the machining operation for the spindle stock 30 is finished. Where there is a further workpiece 47 to be machined in the spindle stock 30, the program returns to step S2 from step S9. Then the spindle stock 30 is supplied with a further workpiece 47 and the first routine of machining is executed on the workpiece 47 in the spindle stock 30 while the second routine of machining is being performed on the workpiece in the spindle stock 31.

When the workpiece 47 is detached from the spindle stock 31 after completion of the second routine of machining in step S8, the program proceeds to step S11 and the main control portion 2 judges whether or not there is a second routine of machining on a further workpiece 47 in the spindle stock 31. When the judgment is that a second routine of machining on a workpiece in the spindle stock 31 is unnecessary since no workpiece 47 has been mounted on the workpiece spindle 32 of the spindle stock 30, the program proceeds to step S12 and the machining on a workpiece in the spindle stock 31 is finished. Where the second routine of machining is to be performed on a workpiece in the spindle stock 31 since a further workpiece 47 has been mounted on the spindle stock 30, the program returns to step S5 and the further workpiece 47, after the first step routine of machining on the spindle stock 30, is delivered to the spindle stock 31. The second routine of machining is performed on the workpiece by the same steps as previously.

In the above-described embodiments, the case described is one in which only a standard workpiece origin SWP1 is provided for the spindle stock 30 for tool setting of each tool 43 on the tool rests 39 and 40. It is possible to set one or more than one standard workpiece origin SWP1 optionally if it is necessary for good control.

Such an example will be described below, in which standard workpiece origins SWP1 and SWP2 are respectively provided for the spindle stocks 30 and 31, with reference to FIGS. 10 and 11. It is helpful for the new example to imagine that the example as shown in FIG. 4 is a specific case where the distance ZL3 between the standard workpiece origins SWP1 and SWP2 is zero when two standard workpiece origins are provided as shown in FIG. 10.

Figure 6:
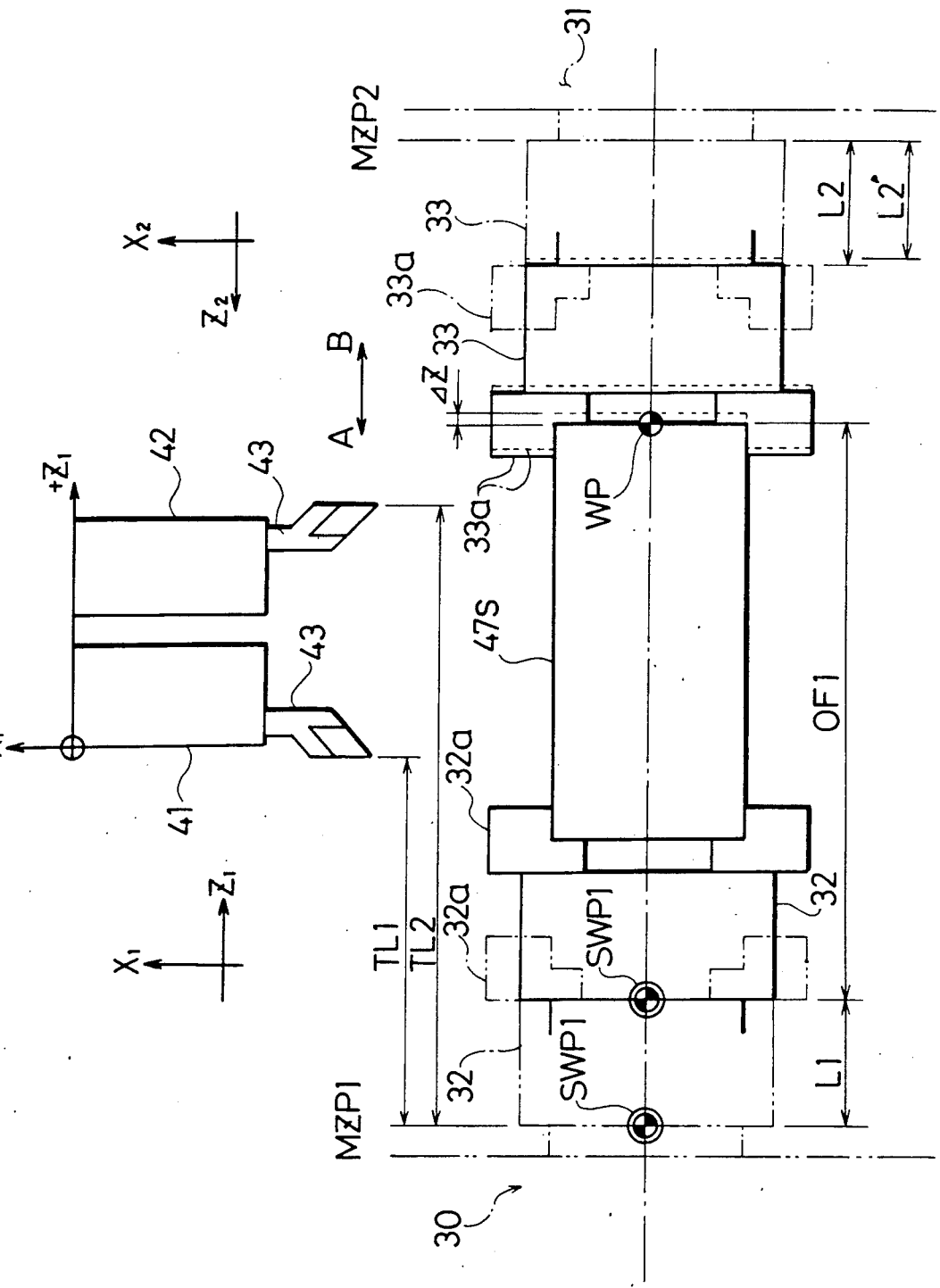
FIG. 6 is a view showing an example of a method of machining a shaft-shaped workpiece.
Figure 10:
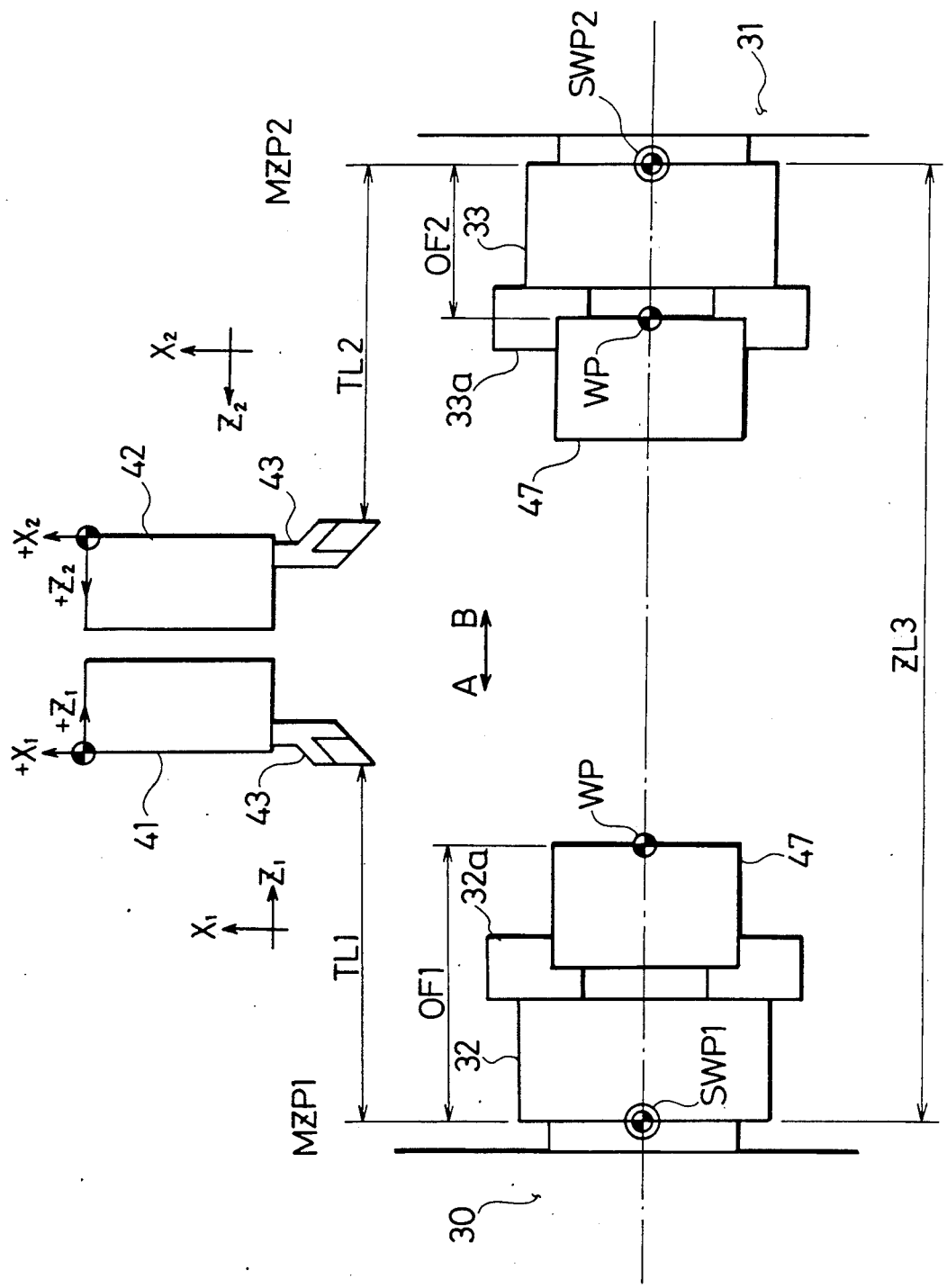
FIGS. 10 and 11 are diagrammatic views showing another example of a method of machining a chuck-like workpiece.
Figure 11:
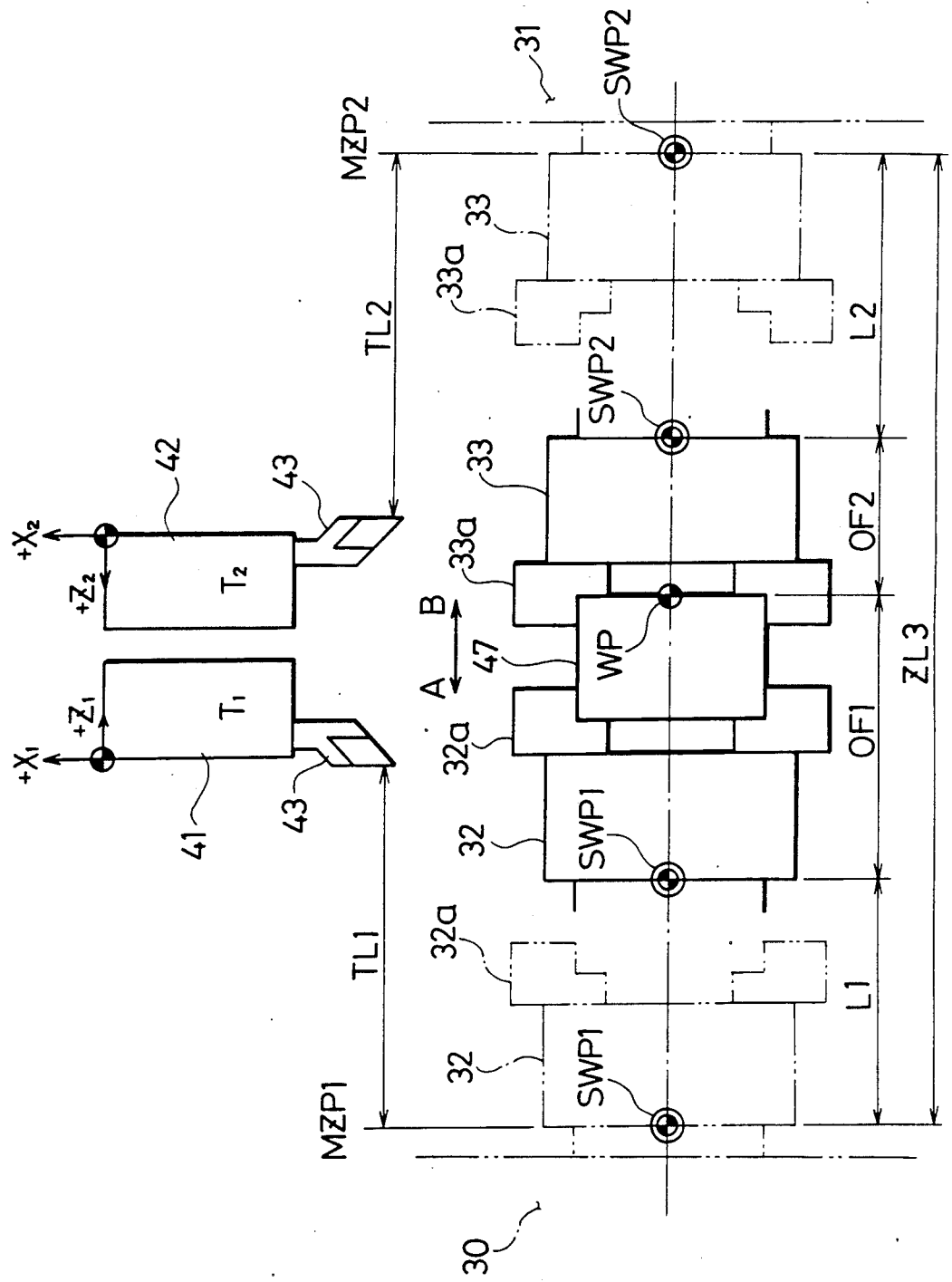

In the cases as shown in FIGS. 10 and 11, it is necessary to provide the first Z-offset value OF1, the first movement distance L1 and the second movement distance L2 as the delivery data WTD. In addition, it is necessary to store the distance ZL3 between the standard workpiece origins SWP1 and SWP2 when the spindle stocks 30 and 31 are positioned at the respective mechanical origins MZP as a parameter in the parameter memory 49. In this case, the machining delivery execution program WTP as shown in FIGS. 2a–2c can be applied as shown and as described above. The machining coordinate system for performing machining on the workpiece 47 is set for the spindle stock 30 in the $Z_1$-$X_1$ direction on the basis of the standard workpiece origin SWP1 in step S3. Moreover, in the delivery of the workpiece 47 after the first routine, the spindle stock 30 is moved with the first movement distance L1 on the basis of the mechanical origin MZP1 in the direction as shown by the arrow B on the $Z_1$-axis and the spindle stock 31 is moved the second movement distance L2 in the direction as shown by the arrow A on $Z_2$-axis. Then, the right end portion of the workpiece 47 of the spindle stock 30 is fitted in and held by the chuck 33a on the workpiece spindle 33 of the spindle stock 31 as shown in FIG. 11 and the transfer of the workpiece 47 between the spindle stocks 30 and 31 is completed.

Where the workpiece is a long and slender shaft-shaped workpiece 47S and the machining is performed by means of the tools 43 installed in the turrets 41 and 42 of the tool rests 39 and 40 in such a manner that the workpiece spindles 32 and 33 are synchronously rotated by the synchronous process computing portion between systems 19 while the workpiece 47S is held between them, as shown in FIG. 6, and the spindle stocks 30 and 31 are synchronously moved and driven in the directions as shown by the arrows A and B, the distance between the standard workpiece origin SWP1 of the spindle stock 30 and the workpiece origin WP or the first Z-offset value OF1, the first movement distance L1 in the $Z_1$-axis direction when the workpiece 47S is delivered from the mechanical origin MZP1 to the spindle stock 31 and the movement distance L2 of the spindle stock 31 from the mechanical origin MZP2 in the $Z_2$-axis direction when the workpiece 47S is delivered to the spindle stock 31 are necessary as the delivery data WTD, as shown in FIG. 6. The machining delivery execution program WTP proceeds to step S13 from step S1 in FIG. 2a and the workpiece 47S is supplied between the workpiece spindles 32 and 33 by means of a proper handling means (not shown). Thereafter, the program proceeds to step S14. The spindle stock 30 is moved the first movement distance L1 in the direction as shown by the arrow B to engage and grip the left end portion of the workpiece 47B in the figure by the chuck 32a on the workpiece spindle 32 and the machining coordinate system on the basis of the standard workpiece origin SWP1 is set in the $Z_1$-axis direction. On this occasion, the first Z-offset value OF1 is set on the basis of the standard workpiece origin SWP1 and the workpiece origin WP is spaced by distance OF1 from the standard workpiece origin SWP1. Thereafter, the program proceeds to step S15. The spindle stock 31 is moved the second movement distance L2 in the direction as shown by the arrow A, that is, in the $Z_2$-axis direction to engage and grip the right end portion of the workpiece 47S by the chuck 33a on the workpiece spindle 33. On this occasion, the second offset value OF2 is obtained by the expression:

$$OF2 = OF1 + L1 + L2 + \Delta x \qquad (2)$$

from the coordinate system computing portion 12 in order to confirm the position of the workpiece origin WP on the Z2 coordinates. $\Delta z$ is the variation in the length of the workpiece 47S in the Z axis direction. The variation can be obtained as the difference between the second movement distance L2 which is inputted as the delivery data WTD in advance and the true movement distance L2′ of the chuck 33a in the $Z_2$-axis direction until the workpiece 47S is held when the spindle stock 31 is moved in the direction as shown by the arrow A to hold the workpiece 47S. In this way, the machining coordinate system is newly set in the $X_2$-axis direction for the spindle stock 31 on the basis of the second offset value OF2. Machining on the basis of the machining program PRO is performed on the workpiece 47S at step S19 by means of the machining coordinate system set for the spindle stock 30 on the basis of the standard workpiece origin SWP1. The distance between the newly set machining coordinate system and the workpiece origin WP becomes L2 $+ \Delta z$, for instance by setting this machining coordinate system and the value becomes fixed. Accordingly, the machining on the workpiece on the spindle stock 30 on the basis of the coordinate system can be easily performed.

When the machining on the workpiece 47S is completed, the program proceeds to step S20. The synchronous driving of the spindle stocks 30 and 31 and the workpiece spindles 32 and 33 by the synchronous process computing portion between systems 19 is ended and the machined workpiece 47S is released from the workpiece spindles 32 and 33 at step S21. Thus, the machining on the workpiece 47S is finished. When the machining on the workpiece 47S ends, the program proceeds to step S22 and it is judged whether or not there is a further workpiece 47S to be machined. In the case where there is a further workpiece 47S to be machined, the program returns to step S13 and machining on the next workpiece 47S is carried out. In the case where there is no further workpiece 47S to be machined, the program proceeds to step S23, execution of the machining program WTP is finished and the machining on the workpiece 47S in the complex machining machine tool 1 ends.

Figure 12:
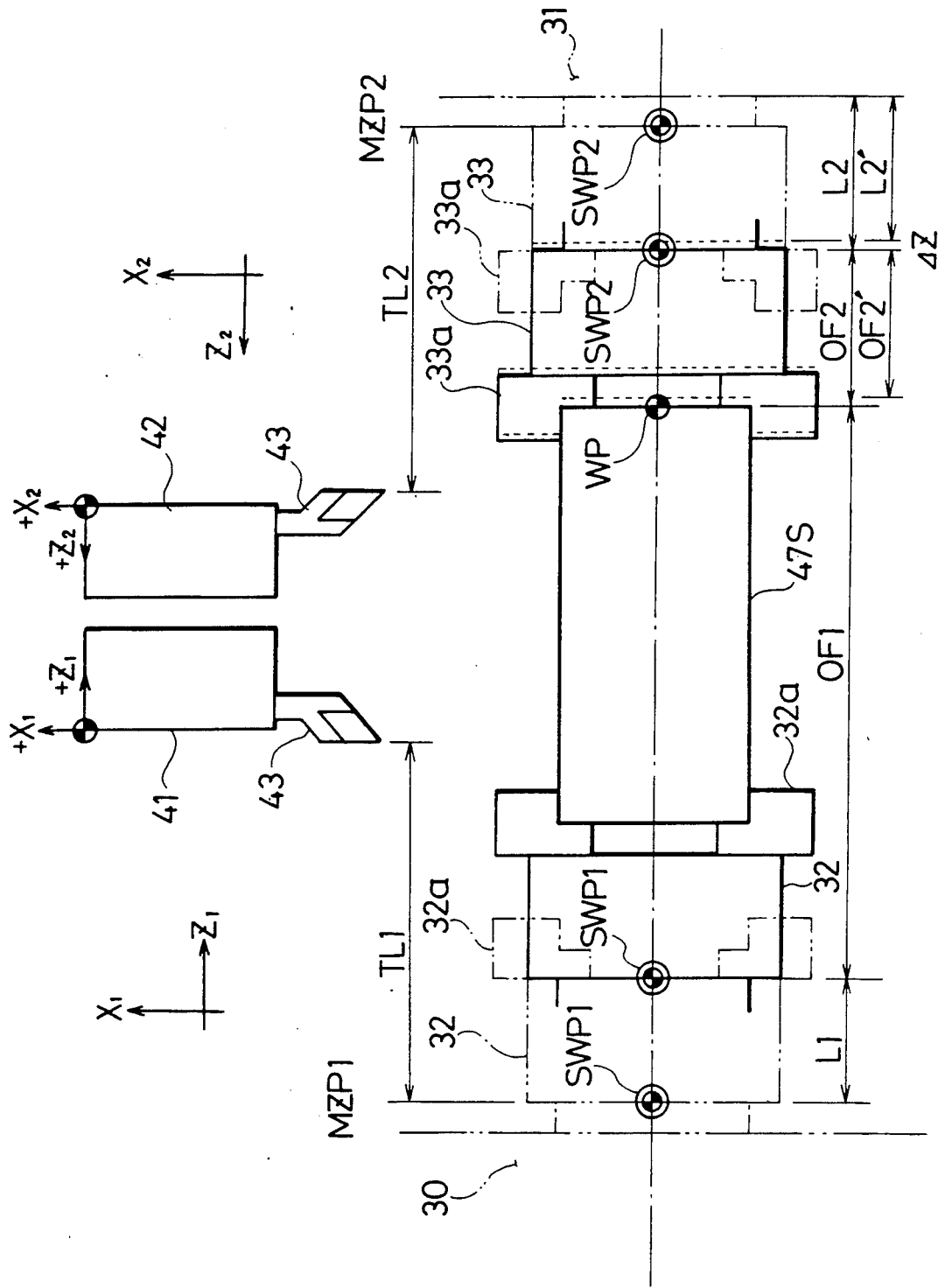
FIG. 12 is a diagrammatic view showing another example of a method of machining a bar-shaped workpiece.

In the case where two standard workpiece origins SWP1 and SWP2 are provided, one on each of the spindle stocks 30 and 31 as shown in FIG. 12, steps 13 through 23 in the machining delivery execution program WTP can be used. On this occasion, data to be inputted as the delivery data WTD is the same as in the case of FIG. 6. However, as shown in FIG. 12, the value of the second offset value OF2 is obtained by the expression $$OF2 = ZL3 - L1 - L2 - OF1 - \Delta x \qquad (3)$$

on the assumption that the distance between the mechanical origins MZP1 and MZP2 of the spindle stocks 30 and 31 stored in the parameter memory 49 as a parameter ZL3. The machining coordinate system in the Z2-axis direction is set based on the standard workpiece origin SWP2 on the basis of the second offset value OF2 and the machining on the workpiece 47S is performed.

Figure 7:
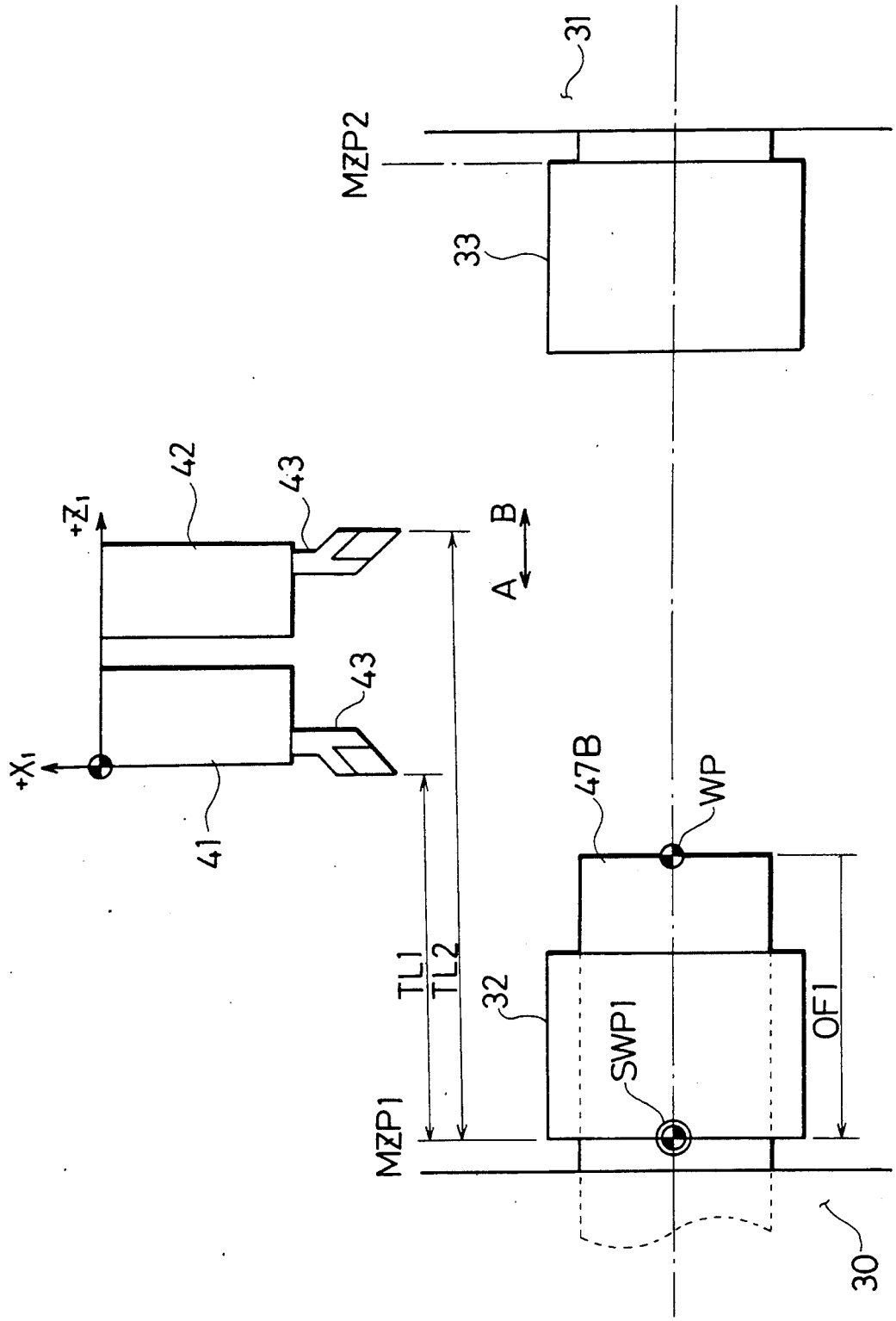
FIGS. 7-9 are diagrammatic views showing an example of a method of machining a bar-shaped workpiece.
Figure 8:
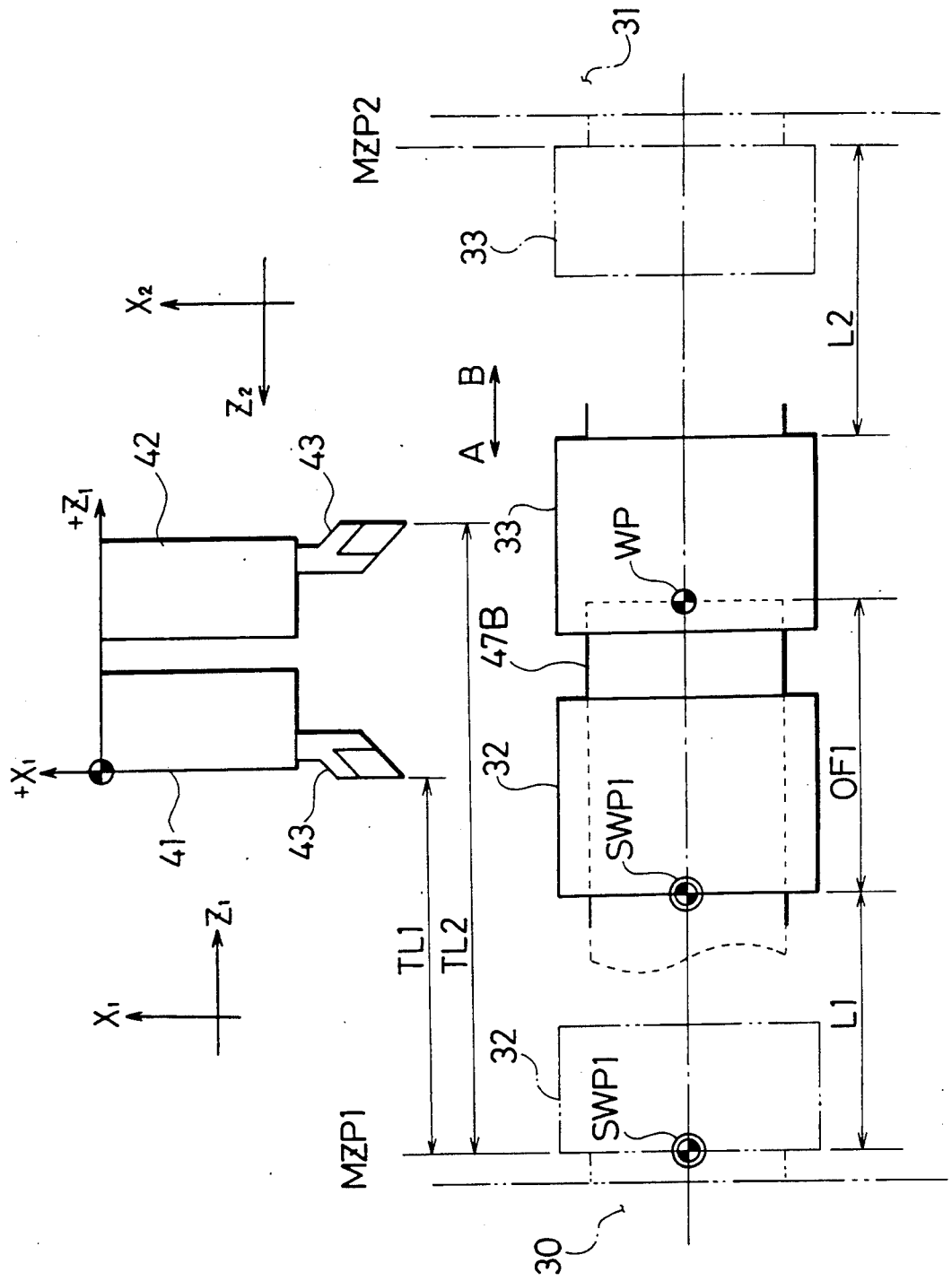
Figure 9:
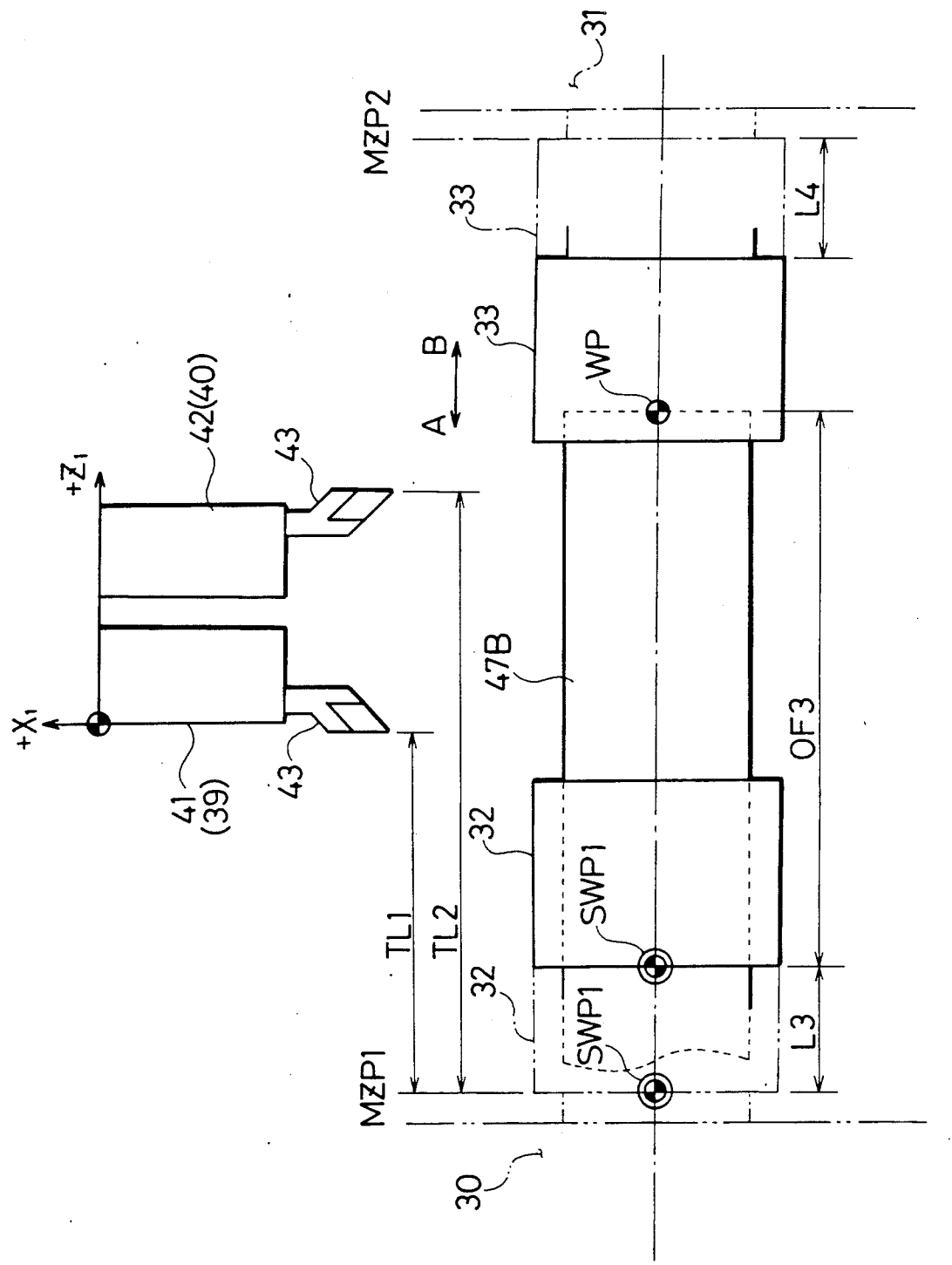

In the case where the workpiece is what is called a bar-shaped workpiece 47B on which machining is performed as the long bar-shaped workpiece 47B is intermittently pulled out through the workpiece spindle 32 in the direction as shown by the arrow B in FIG. 7, an operator needs the movement distance L3 of the spindle stock 30 from the mechanical origin MZP1 and the movement distance L4 of the spindle stock 31 from the mechanical origin MZP2 when the workpiece 47B is pulled out through the workpiece spindle 32 in the direction as shown by the arrow B as shown in FIG. 9 as well as the first Z-offset value OF1, the first movement distance L1 and the second movement distance L2 the same as for the earlier described workpieces 47 and 47S, as shown in FIG. 8, as the delivery data WTD in order to execute the machining delivery execution program WTP.

In this way, after an operator inputs the above-described delivery data WTD through the input portion 6, the machining delivery execution program WTP is started and proceeds to step S24 via step Sl. At step S24, the workpiece 47B is supplied in such a way that its leading end extends through and protrudes from the workpiece spindle 32 a predetermined distance in the direction as shown by the arrow B as shown in FIG. 7. That is to say, the leading end of the workpiece 47B extends from the standard workpiece origin SWP1 a distance corresponding to the first offset value OF1 in the direction as shown by the arrow B. After the workpiece spindle 32 is supplied with the workpiece 47B as shown in FIG. 7, the program proceeds to step S25 and a new machining coordinate system is set in a $Z_1$-axis direction on the assumption that the standard workpiece origin SWP1 of the spindle stock 30 is the origin.

In this way, after the machining coordinate system is newly set on the basis of the standard workpiece origin SWP1, the program proceeds to step S26 and the first routine of machining is performed on the workpiece 47B held by the workpiece spindle 32. When the first routine of machining ends, the program proceeds to step S27 and the operation is performed in order to deliver the workpiece 47B from the spindle stock 30 to the spindle stock 31. This operation is performed by fitting and engaging the leading end, which is the right end portion in FIG. 8, of the workpiece 47B to the workpiece spindle 33 of the spindle stock 31 by moving the spindle stock 30 the first movement distance L1 in the direction as shown by the arrow B through the coordinate system computing portion 12, the first spindle control portion 22 and the like, and moving the spindle stock 31 the second movement distance L2 in the direction as shown by the arrow A through the coordinate system computing portion 12, the second spindle control portion 23 and the like as shown in FIG. 8.

In this way, when the workpiece 47B is held by the workpiece spindles 32 and 33, the program proceeds to step S28 and the second Z-offset value OF2 of the workpiece origin SP for the spindle stock 33 as shown in FIG. 8 is obtained. The second Z-offset value OF2 can be obtained by the following expression.

$$OF2 = L1 + OF1 + L2 \quad (4)$$

In the case where machining is performed on the workpiece 47B in the state as shown in FIG. 8, a new machining coordinate system in the Z2 direction is set at the position which is the second Z-offset value OF2 apart from the mechanical origin MZP1 as shown in FIG. 8 toward the right end in the figure and machining is performed on the basis of this coordinate system. In this case, the distance between the origin of the machining coordinate system set at the position which is the second Z-offset value OF2 apart from the mechanical origin MZP1 and the workpiece origin WP becomes L2 and the value becomes fixed. Accordingly, machining at the spindle stock 31 can be exactly and smoothly executed on the basis of the newly set coordinate system.

After a predetermined machining is performed, the program proceeds to step S29, the bar shaped workpiece is pulled out from the workpiece spindle 32 a predetermined length in the direction as shown by the arrow B in FIG. 9 in such a manner that the spindle stock 30 is moved in the direction as shown by the arrow A so that the distance between the mechanical origin MZP1 and the standard workpiece origin SWP1 is a third movement distance L3 and the spindle stock 31 is moved in the direction as shown by the arrow B so that the distance between the mechanical origin MZP2 and the spindle stock 31 will be the fourth movement distance L4. When the workpiece 47B is pulled out from the workpiece spindle 32, the program proceeds to step S30. The left end portion of the workpiece 47B is detected by a known terminal detecting means (not shown) provided in the workpiece spindle 32 as pulling of the workpiece 47B continues and it is judged whether or not further machining can be formed on the workpiece 47B.

In the case where the judgment at step S30 is that the terminal portion of the workpiece has been detected and there is insufficient length of workpiece 47B to be pulled out, the program proceeds to step S31. For the spindle stock 30, the program proceeds to step S32 and it is judged whether or not there is a further workpiece 47B to be machined. In the case where there is a further workpiece 47B to be machined, the program returns to step S24 and the same machining as described before is performed by supplying the spindle stock 30 with a new workpiece 47B. In the case where there is no further workpiece 47B to be machined, the program proceeds to step S33 and the machining movement of the workpiece 47B is ended.

The program proceeds to step S34 from step S31 for the spindle stock 31, the second routine of machining is performed on the workpiece 47B delivered to the spindle stock 31 on the basis of the machining program PRO and the workpiece 47B after completion of the second routine of machining is removed from the workpiece spindle 33 at step S35. When the workpiece 47B is removed, the program proceeds to step S36 and it is judged whether or not there is a further length of workpiece 47B to be machined at the spindle stock 31. In the case where there is no further length of workpiece 47B to be machined, the program proceeds to step S37 and the machining movement of the workpiece 47B at the spindle stock 31 is ended. Where there is a further length of workpiece 47B to be machined at the spindle stock 31, the program returns to step S27 and the part of the workpiece 47B on which the first routine has been completed is delivered from the spindle stock 30 to the spindle stock 31. Thereafter, the predetermined machining routine is performed on the workpiece 47B.

In the case where the judgment is that there is a further workpiece 47B to be pulled out of the spindle at step S30, the program proceeds to step S38 and it is judged whether or not it is time to perform a cutting-off operation on the workpiece 47B pulled out in step S29 by analyzing the machining program PRO in the program interpretation computing portion 16. In the case where the predetermined machining routine is finished and the machining program PRO directs performance of cutting-off machining on the workpiece 47B, the program proceeds to step S40 for the spindle stock 30 through step S39 after cutting-off machining and it is judged whether or not there is a further workpiece 47B to be machined in the spindle stock 30. In the case where there is no further workpiece 47B to be machined, the program proceeds to step S41 and machining at the spindle stock 30 is ended. Where there is a further workpiece 47B to be machined in the spindle stock 30, the program returns to step S25 and the first routine of machining is started on the further workpiece 47B held by the workpiece spindle 32.

For the spindle stock 31, the program proceeds to step S42 and a predetermined second routine of machining is executed on the workpiece 47B after the cutting-off machining by means of the tool rest 40. When the machining is finished, the program proceeds to step S43 and the workpiece 47B on which the second routine of machining has been performed is removed from the workpiece spindle 33. Thereafter, it is judged whether or not there is a workpiece 47B to be machined at the spindle stock 31 at step S44. In the case where there is no workpiece 47B to be machined, the program proceeds to step S45 and the machining movement of the workpiece 47B by the spindle stock 31 is ended. Where there is a workpiece 47B to be machined at the spindle stock 31, the program returns to step S27 and the workpiece 47B on which the first machining routine has been finished is delivered from the spindle stock 30 to the spindle stock 31. Thereafter, a predetermined machining is performed on the workpiece 47B.

In the case where the machining program PRO does not direct cutting-off machining on the workpiece 47B at step S38, the program proceeds to step S46 and the third Z-offset value OF3 of the workpiece origin WP for the standard workpiece origin SWP1 at the spindle stock 30 is obtained. That is, the third Z-offset value OF3 can be obtained by the expression (5).

$$OF3 = L1 - L3 + L2 - L4 + OF1 \quad (5)$$

In this way, after the third Z-offset value OF3 is obtained, a new machining coordinate system is set in the $X_1$-$Z_1$ direction from the standard workpiece origin SWP1 of the spindle stock 30 and the third routine of machining is performed on the workpiece 47B portion newly pulled out of the workpiece spindle 32 at step S47 on the basis of the machining program PRO.

After the third routine of machining is performed on the workpiece 47B, the program proceeds to step S48, the movement to be executed at steps 27 and 29 is performed on the spindle stocks 30 and 31 again, a predetermined length of the raw portion of the workpiece 47B which had been within the workpiece spindle 32 is pulled out in the direction as shown by the arrow B in FIG. 9, the fourth offset position is computed in order to obtain the position of the workpiece origin WZ from the standard workpiece origin SWP1 at step S39 in the same way as in step S46 and a new machining coordinate system is set at the standard workpiece origin SWP1 of the spindle stock 30.

Thereafter, cutting-off machining is performed on the workpiece 47B at the predetermined position indicated on the machining program PRO at step S50. For the spindle stock 30, the program proceeds to step S52 from step S51 and it is judged whether or not there is a further part of a workpiece 47B to be machined still in the spindle stock 30. Where there is no further workpiece 47B to be machined, the program proceeds to step S53 and the machining movement of the spindle stock 30 is finished. Where there is judged to be a further part of a workpiece 47B to be machined in the spindle stock 30 at step S52, the program proceeds to step S24 and a new workpiece 47B is supplied and machining continues. On the other hand, the program proceeds to step S54 for the spindle stock 31 and the fourth routine of machining is performed on the workpiece 47B at the spindle stock 31 on the basis of the machining program PRO. When the machining is completed, the program proceeds to step S55 and the workpiece 47B on which the first machining routine through the fourth machining routine has been carried out is removed from the spindle stock 31. The main control portion 2 judges whether or not there is a further workpiece 47B to be machined in the spindle stock 31 at step S56. Where there is no workpiece 47B to be machined, the program proceeds to step S57 and the machining movement of the workpiece 47B by the spindle stock 31 is ended. Where there is judged to be a workpiece 47B to be machined in the spindle stock 31 at step S56, the program returns to step S27, the workpiece 47B to be machined and on which the first machining routine has been completed is delivered from the spindle stock 30. Then, machining is continued as described hereinbefore.

The present invention has been explained according to the several embodiments. However, the invention is not limited to the embodiments described in the present specification, but these are intended to be exemplary. The scope of the invention is as set forth in the attached claims, and these are not limited to the described embodiments. Accordingly, all obvious modifications and changes are considered to be within the scope of the claims.

I claim:

1. A method for setting a machining coordinate system in a machine tool having first and second spaced opposed spindle stocks which are relatively movable toward and away from each other in a first direction and having rotatable workpiece spindles by which a workpiece can be held on the respective spindle stocks, comprising:
   composing a machining program on the basis of a workpiece origin established for a workpiece;
   setting a standard origin which moves together with one spindle stock in said first direction at least between the two spindle stocks;
   setting a distance between said standard origin and said workpiece origin as a first offset value;
   setting a first machining coordinate system for said first spindle stock on the basis of said first offset value and using said first machining coordinate system for performing machining of the workpiece in the first spindle stock according to said machining program; and
   setting a second machining coordinate system for the second spindle stock on the basis of said first offset value and an amount of movement of said second spindle stock toward a mechanical origin, and using said second machining coordinate system for performing machining on the workpiece in the second spindle stock according to said machining program.

2. A method for setting a machining coordinate system in a machine tool having first and second spaced opposed spindle stocks which are relatively movable toward and away from each other in a first direction and having rotatable workpiece spindles by which a workpiece can be held on the respective spindle stocks, comprising:
   composing a machining program on the basis of a workpiece origin established for a workpiece;
   setting a first standard origin which moves together with the first spindle stock in said first direction;
   setting a second standard origin which moves together with the second spindle stock in said first direction;
   setting the distance between a workpiece origin of a workpiece mounted in said first spindle stock and said first standard origin as a first offset value;
   setting the distance between said workpiece origin of said workpiece mounted in said second spindle stock and said second standard origin as a second offset value;
   setting a first machining coordinate system for said first spindle stock on the basis of said first offset value and using said first machining coordinate system for performing machining on said workpiece mounted in said first spindle stock according to said machining program; and
   setting a second machining coordinate system for said second spindle stock on the basis of said second offset value and using said second machining coordinate system for performing machining on said workpiece mounted in said second spindle stock according to said machining program.

3. A method for setting a machining coordinate system in a machine tool having first and second spaced opposed spindle stocks which are relatively movable toward and away from each other in a first direction and having rotatable workpiece spindles by which a workpiece can be held on the respective spindle stocks, comprising:
   composing a machining program on the basis of a workpiece origin established for a workpiece;
   setting a standard origin which moves together with one spindle stock in said first direction at least between the two spindle stocks;
   setting a distance between said standard origin and said workpiece origin as a first offset value;
   setting a first machining coordinate system for said first spindle stock on the basis of said first offset value and using said first machining coordinate system for performing machining of the workpiece in the first spindle stock according to said machining program;
   moving said first and second spindle stocks a first and second distance, respectively, toward each other for bringing said spindle stocks close together when the machining of the workpiece in the first spindle stock is completed, and transferring the workpiece from said first spindle stock to said second spindle stock;

obtaining a second offset value based on said first offset value and said first and second distances;

setting a second machining coordinate system for said second spindle stock on the basis of said second offset value, and using said second machining coordinate system for performing machining on the workpiece in said second spindle stock according to said machining program.

4. A method for setting a machining coordinate system in a machine tool having first and second spaced opposed spindle stocks which are relatively movable toward and away from each other in a first direction and having rotatable workpiece spindles by which a workpiece can be held on the respective spindle stocks, comprising:

composing a machining program on the basis of a workpiece origin established for a workpiece;

setting a first standard origin which moves together with the first spindle stock in said first direction;

setting a second standard origin which moves together with the second spindle stock in said first direction;

setting the distance between a workpiece origin of a workpiece mounted in said first spindle stock and said first standard origin as a first offset value;

setting the distance between said workpiece origin of said workpiece mounted in said second spindle stock and said second standard origin as a second offset value;

setting a first machining coordinate system for said first spindle stock on the basis of said first offset value and using said first machining coordinate system for performing machining on said workpiece mounted in said first spindle stock according to said machining program;

moving said first and second spindle stocks a first and second distance, respectively, toward each other for bringing said spindle stocks close together when the machining of the workpiece in the first spindle stock is completed, and transferring the workpiece from said first spindle stock to said second spindle stock;

setting a second machining coordinate system for said second spindle stock on the basis of said second offset value, and using said second machining coordinate system for performing machining on the workpiece in said second spindle stock according to said machining program.

5. A method for setting a machining coordinate system in a machine tool having first and second spaced opposed spindle stocks which are relatively movable toward and away from each other in a first direction and having rotatable workpiece spindles by which a workpiece can be held on the respective spindle stocks, comprising:

composing a machining program on the basis of a workpiece origin established for a workpiece;

setting a standard origin which moves together with one spindle stock in said first direction at least between the two spindle stocks;

setting a distance between said standard origin and said workpiece origin as a first offset value;

moving said first and second spindle stocks toward each other first and second distances for engaging and holding a workpiece to be machined therebetween;

setting a first machine coordinate system for said first spindle stock on the basis of said first offset value and the first distance, and setting a second machining coordinate system for said second spindle stock on the basis of said first offset value and said second distance, and using said first and second machining coordinate system for performing machining of the workpiece according to the machining program.

6. A method for setting a machining coordinate system in a machine tool having first and second spaced opposed spindle stocks which are relatively movable toward and away from each other in a first direction and having rotatable workpiece spindles by which a workpiece can be held on the respective spindle stocks, comprising:

composing a machining program on the basis of a workpiece origin established for a workpiece;

setting a first standard origin which moves together with the first spindle stock in said first direction;

setting a second standard origin which moves together with the second spindle stock in said first direction;

setting the distance between a workpiece origin of a workpiece mounted in said first spindle stock and said first standard origin as a first offset value;

setting the distance between said workpiece origin of said workpiece mounted in said second spindle stock and said second standard origin as a second offset value;

moving said first and second spindle stocks toward each other first and second distances for engaging and holding a workpiece to be machined therebetween;

setting a first machine coordinate system for said first spindle stock on the basis of said first offset value and the first distance, and setting a second machining coordinate system for said second spindle stock on the basis of said first offset value and said second distance, and using said first and second machining coordinate systems for performing machining of the workpiece according to the machining program.

7. A method for setting a machining coordinate system in a machine tool having first and second spaced opposed spindle stocks which are relatively movable toward and away from each other in a first direction and having rotatable workpiece spindles by which a workpiece can be held on the respective spindle stocks, comprising:

composing a machining program on the basis of a workpiece origin established for a workpiece;

setting a standard origin which moves together with one spindle stock in said first direction at least between the two spindle stocks;

setting a distance between said standard origin and said workpiece origin as a first offset value;

causing a workpiece to extend through said first spindle stock and project toward said second spindle stock by an amount corresponding to the first offset value;

setting a first machining coordinate system for said first spindle stock on the basis of said first offset value and using said first machining coordinate system for performing a first machining of the workpiece held in the first spindle stock according to said machining program;

after completion of the first machining, moving said first and second spindle stocks toward each other through first and second distances, respectively, and gripping the end of the workpiece projecting from said first spindle stock by said second spindle stock;

releasing the workpiece from said first spindle stock and moving said first and second spindle stocks away from each other through third and four the distances, respectively, for pulling a length of said workpiece corresponding to the third and fourth distances through said first spindle stock;

setting the distance of the position of the workpiece origin of the thus pulled through workpiece from said standard origin as a third offset value; and setting a second machining coordinate system for the first spindle stock on the basis of said third offset value and using said second machining coordinate system for performing a second machining of the workpiece pulled through said first spindle stock according to said machining program.

* * * * *